US005565936A

United States Patent [19]

Kim et al.

[11] Patent Number: 5,565,936

[45] Date of Patent: Oct. 15, 1996

[54] FILM WITH PRE-EXPOSED IMAGE AND MASKING SYSTEM

[76] Inventors: Song K. Kim; Min K. Kim, both of 20243 Acre St., Winnetka, Calif. 91306

[21] Appl. No.: 391,522

[22] Filed: Feb. 21, 1995

Related U.S. Application Data

[63] Continuation-in-part of Ser. No. 262,635, Jun. 20, 1994, abandoned.

[51] Int. Cl.[6] .............................. G03B 35/00; G03B 1/00

[52] U.S. Cl. .............................................. 396/340; 396/335

[58] Field of Search .................................... 354/110, 120, 354/295, 296, 122, 125

[56] References Cited

U.S. PATENT DOCUMENTS

| | | | |
|---|---|---|---|
| 4,011,570 | 3/1977 | Stievenart et al. | 354/89 |
| 4,827,291 | 5/1989 | Guez | 354/125 |
| 4,994,832 | 2/1991 | Spector | 354/110 |
| 5,111,224 | 5/1992 | Spector | 354/125 |
| 5,142,311 | 8/1992 | Olson et al. | 354/120 |
| 5,187,512 | 2/1993 | Kirkendall | 354/120 |
| 5,189,453 | 2/1993 | Boyd | 354/122 |
| 5,189,467 | 2/1993 | Wheeler | 354/110 |
| 5,192,648 | 3/1993 | Burnham | 354/159 |

*Primary Examiner*—Safet Metjahic
*Assistant Examiner*—Nicholas J. Tuccillo
*Attorney, Agent, or Firm*—Eugene Oak, Ph.D., J.D.

[57] ABSTRACT

Camera film has a pre-exposed image longitudinally thereon and is thereupon packaged into a canister for insertion into a camera. The canister carries a flexible masking strip. When the canister is inserted into the camera, the masking strip is spread across the camera film plane opening. As the film is advanced across the film plane opening for successive exposures, the masking strip prevents individual frame exposure of the previously exposed image. A masking insert can be alternatively inserted into the camera to mask the film edge.

14 Claims, 5 Drawing Sheets

FILM WITH PRE-EXPOSED IMAGE AND MASKING SYSTEM

CROSS-REFERENCE TO RELATED APPLICATION

This application is a continuation-in-part of our previously filed application Ser. No. 08/262,635, filed on Jun. 20, 1994, for "Customized Film.," now abandoned.

BACKGROUND OF THE INVENTION

1. Field of the Invention

This invention is directed to a system whereby pre-exposed film can be inserted into a standard camera to create camera exposures which carry both a picture exposure and a masked pre-exposed image.

2. Description of the Prior Art

In general, cameras are configured to position a film at an aperture on the image frame. Actuation of the camera shutter exposes an image on that portion of the film. The film manufacturer often pre-exposes the edges of the film to identify the manufacturer, style of film, and sometimes batch number. These pre-exposures are at the edge of the film so that they do not appear in the image area defined by the camera aperture at the image plane.

Another film exposure is by means of a data back. This is as part of the camera which exposes a portion of the film in the camera within the image aperture. The data back may expose time, date and/or other information. This information is not pre-exposed on the film. It is desirable to create a system where a pre-exposed image can be exposed on the camera film before it is packaged for camera insertion. This exposure would appear in the image aperture. A masking system would be provided to prevent the light through the camera lens from double-exposing this pre-exposed image.

SUMMARY OF THE INVENTION

In order to aid in the understanding of this invention, it can be stated in essentially a summary form that it is directed to a film with pre-exposed image together with a system for masking that image in the camera to avoid double-exposure of the pre-exposed image area.

It is, thus, a purpose and advantage of this invention to allow a camera user to use a film which has been pre-exposed in the image area to be used in a standard camera so that the user can take pictures and have the pre-exposed image appear in the picture.

It is a further object and advantage of this invention to provide a pre-exposed film and a masking system which is able to produce an image on the film within the film plane aperture of the camera.

It is a further object and advantage of this invention to provide a pre-exposed image within the image area of the film which is of a different color than the remainder of the exposed area for emphasizing the pre-exposed image with respect to the picture exposed on the film.

It is a further purpose and advantage of the present invention to provide a film which has supplied therewith an opaque strip for covering the pre-exposed image as it is positioned in the film plane aperture of the camera to avoid further exposure of the pre-exposed image.

Further objects and advantages of this invention will become apparent from a study of the following portion of the specification, the claims and the attached drawings.

DETAILED DESCRIPTION OF THE PREFERRED EMBODIMENT

Figure 1:
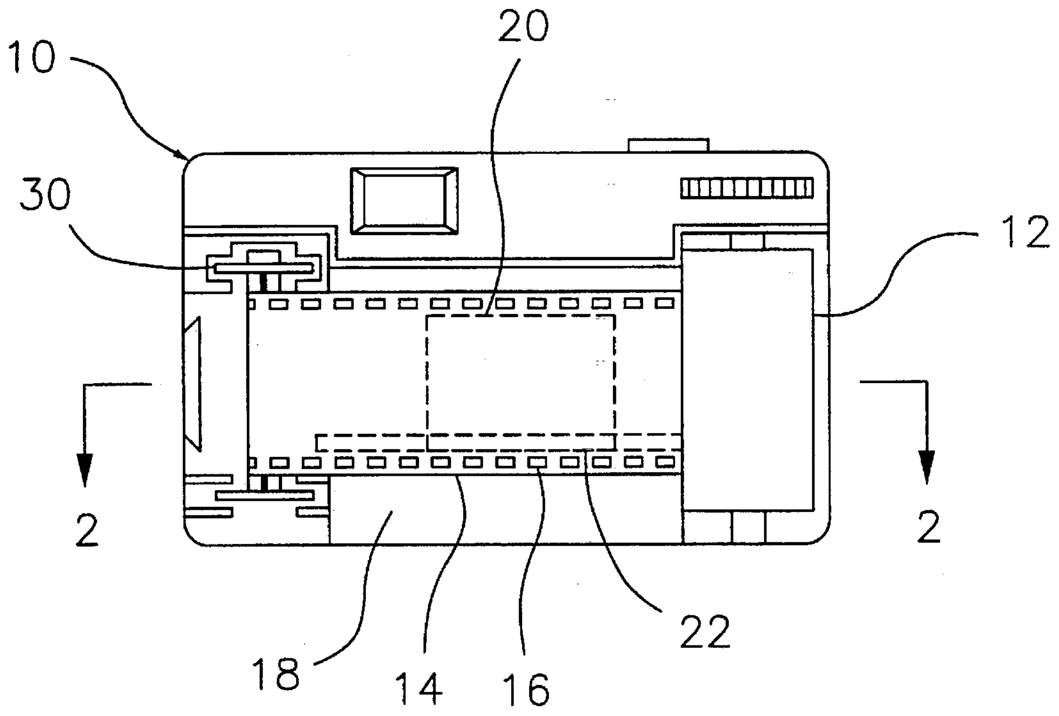
FIG. 1 is a rear elevational view of a standard camera with its rear cover removed, showing the film with pre-exposed image and masking system of this invention.
Figure 2:
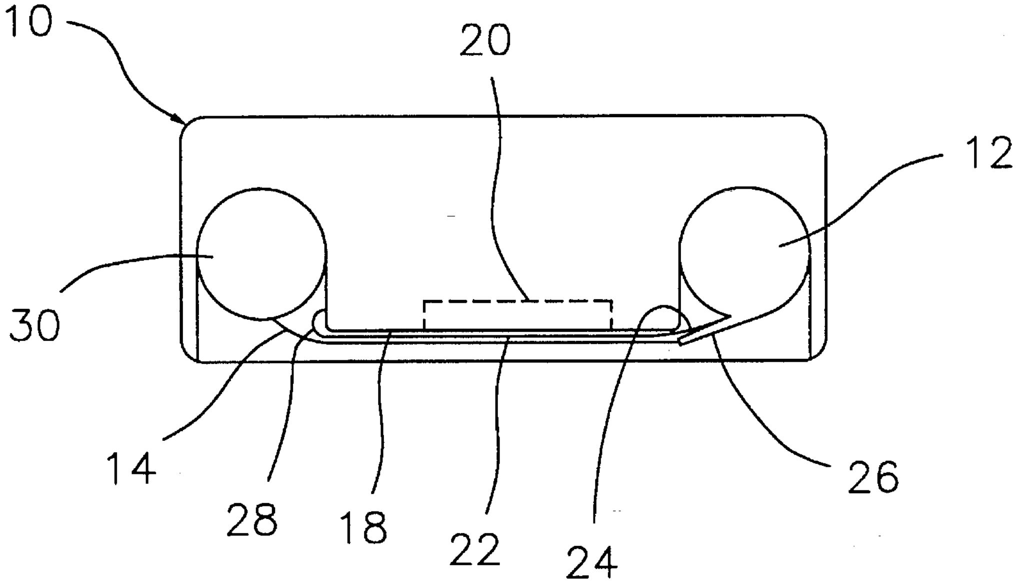
FIG. 2 is a downwardly looking section taken generally along line 2—2 of FIG. 1.

FIGS. 1 and 2 show a standard 35 millimeter camera which receives a film canister 12 (see FIGS. 1, 2, 3 and 4). The canister contains film 14. The usual 35 millimeter film is provided with sprocket holes 16, as illustrated. The film is drawn across the flat surface interior of the camera which defines the film plane 18. The back panel in the camera has an opening 20 therein which defines the picture aperture. In the standard camera, the picture aperture defines the exposed picture area on the film.

In the present invention, the film has a latent image exposed therein along the longitudinal film strip which is normally within the picture aperture 20. The latent image is pre-exposed before the film is wound into the canister. The pre-exposure of the latent image is in the area which normally would ultimately be part of the picture exposure. After exposure of the latent image, the film is wound into the canister 12.

Figure 3:
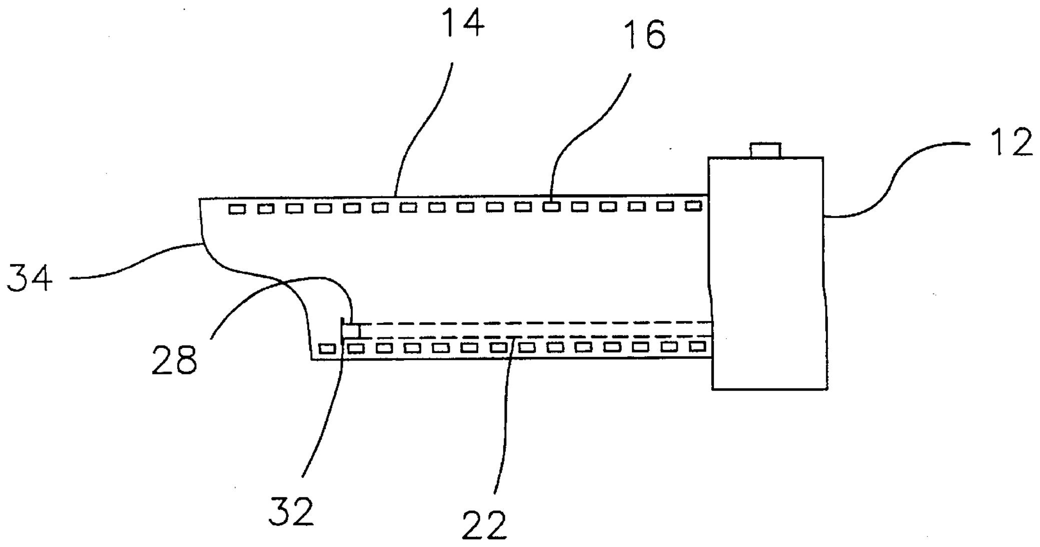
FIG. 3 is a rear elevational view of a film canister with its film having a pre-exposed image thereon ready for installation in the standard camera.
Figure 4:
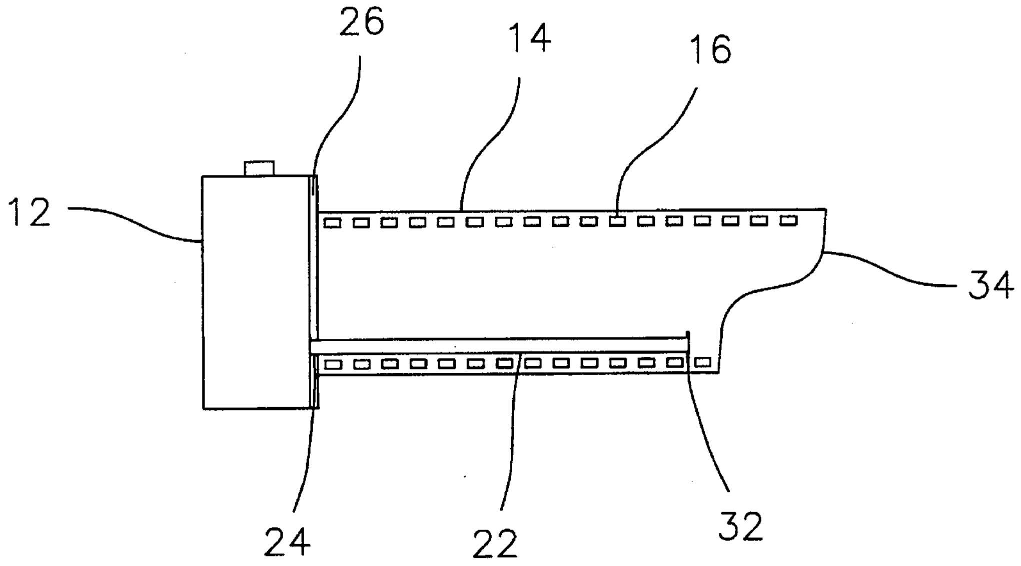
FIG. 4 is a front elevational view of the film and canister shown in FIG. 3.

In order to prevent the latent image from receiving additional exposure when the film is normally exposed in the camera, a mask is provided. This mask is in the form of a flexible strip 22, see FIGS. 1, 2, 3 and 4. In FIGS. 1 and 3, the mask strip 22 is on the far side of the film 14 and is shown in dashed line. The inner end 24 of the mask strip 22 is secured on the back of the lip 26 on the conventional canister. The outer end of the mask strip 22 carries hook 28, which is hooked around the far end of the wall in which the picture aperture is formed. The hook engages in the recess which carries the takeup reel 30. The hook is detachably attached to the film, as by being inserted through slit 32 in the film 14 near its free end 34.

Figure 5:
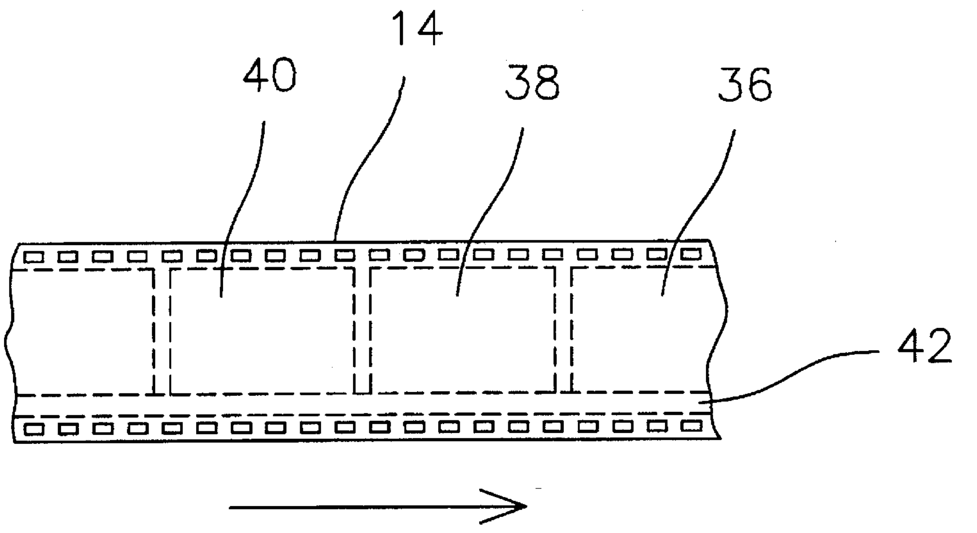
FIG. 5 is an enlarged view of the film in the camera, as seen from the side of FIG. 4, after pictures have been exposed thereon.

When the camera 10 is to be loaded, the back is opened and the canister 12 is placed into its pocket in the camera. The outer end of the film extends from the canister, as is conventional. Hook 28 is detached from the film and is hooked around the wall defining the takeup reel pocket. The outer end 34 of the film is attached to the takeup reel 30, and the camera back is closed. The mask strip 22 is opaque. As the film is advanced and pictures taken, latent pictures 36, 38 and 40 are successively exposed on film 14, as shown in FIG. 5. However, the picture image does not further expose the pre-exposed image which is positioned longitudinally along the strip 42. It is this strip which is within the picture aperture, but is not exposed by the picture exposure because of the presence of the opaque mask strip 22. Thus, there is not a double exposure along the pre-exposed latent image along strip 42, but this cuts off the bottom of the aperture and reduces the height of the latent picture exposure. The masked strip may be anywhere from top to bottom of the picture aperture, but to minimize the interference with the picture exposure, it is preferably adjacent the top or bottom edge, and more preferably adjacent the bottom edge as shown.

After development of the film strip, the pre-exposed latent image is developed with the latent picture image. The latent pictures 36, 38 and 40 now becomes pictures 44, 46, 48, respectively. The strip of pre-exposed image becomes developed image strip 50. Since the developed image strip 50 lies within the normal boundaries of the normal picture aperture 20, it is developed and printed with standard equipment. The aspect ratio of the developed pictures, including the developed image strip becomes the same as an ordinary picture. Thus, the developed image strip 50 appears in the normal picture without modification of camera or printing equipment.

Figure 7:
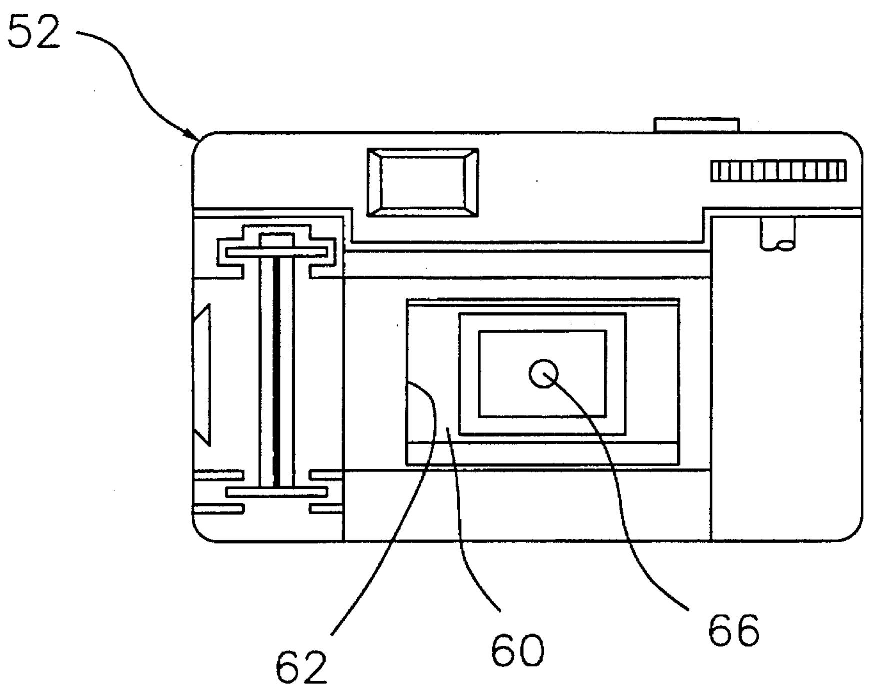
FIG. 7 is a rear elevational view of a standard camera having a masking insert installed therein.
Figure 10:
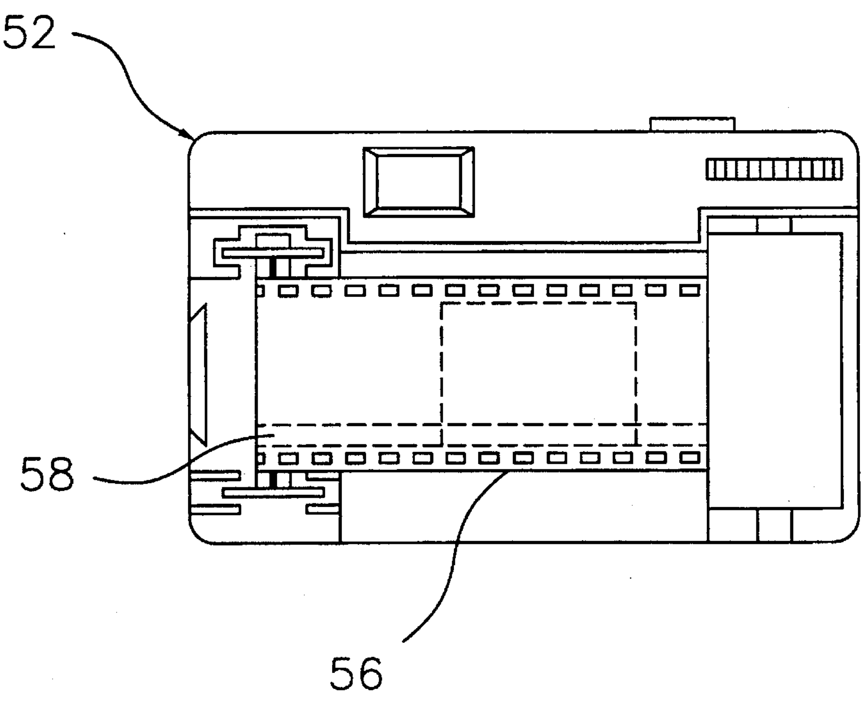
FIG. 10 is a view similar to FIG. 1, showing the pre-exposed film in place with the masking insert of FIG. 8 protecting the lower edge of the film from exposure.

The camera 52, shown in FIGS. 7 and 10, is the same as camera 10. Similarly, the film canister 54 is the same as canister 12. The canister 54 carries film 56, which is the same as film 14. The film 56 has a latent image 58 pre-exposed thereon in a strip positioned on the film 56 where it would normally cross the picture aperture in the camera 52. However, the bottom of the picture aperture corresponding to the position of the latent image 58 is masked to prevent double exposure of the latent image. In this case, the mask 60 is a box having open front and back, which is inserted into the recess 62 in the camera. This recess is between the lens and shutter mechanism seen through the mask in FIG. 7 and the film plane. The picture aperture is defined at the film plane by the edges of this recess. The picture aperture is reduced on the bottom by having a flange 64 along the bottom wall thereof. The mask flange is the only part that is significantly in the optical path from the lens 66 to the film plane at the picture aperture.

Figure 9:
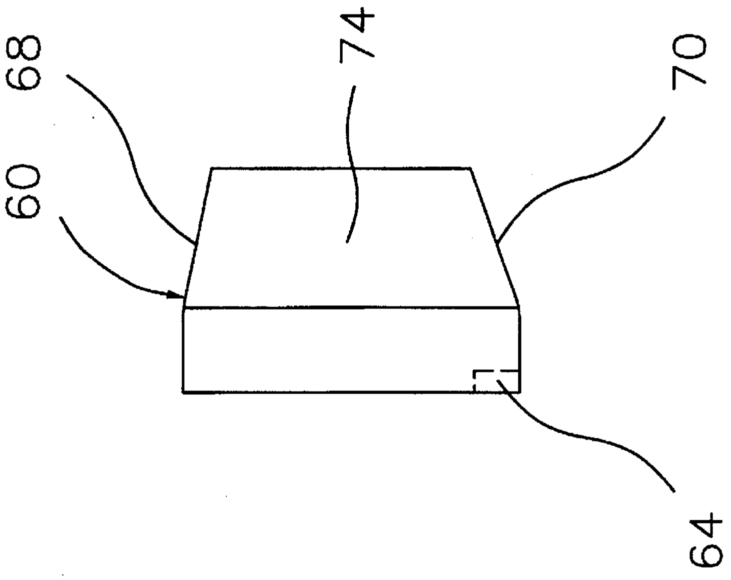
FIG. 9 is a side elevational view of the masking insert.
Figure 8:
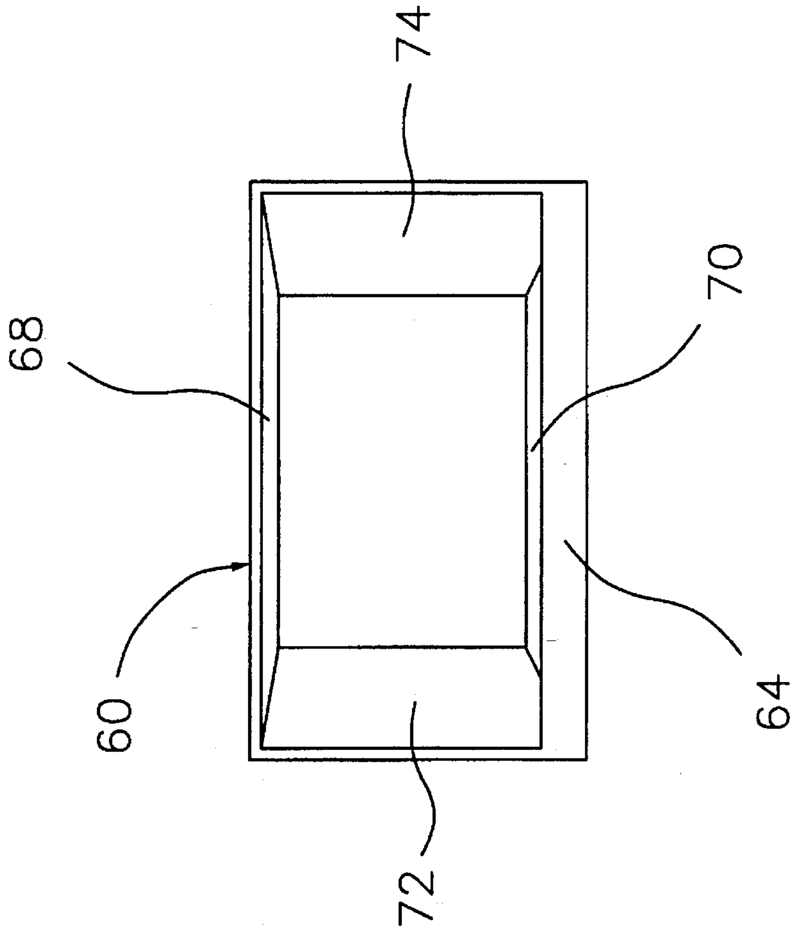
FIG. 8 is an enlarged rear elevational view of the masking insert.

As seen in FIGS. 8 and 9, the mask 60 is a rectangular box formed of top and bottom walls 68 and 70 and side walls 72 and 74. Functionally, only the mask flange 64 is required. However, the top and bottom walls are sized and configured to snap into the recess in the camera which is open from the back through the picture aperture. The side walls are only necessary to space the top and bottom walls from each other, and the top wall is only necessary to retain the bottom wall with its flange 64 in place.

Figure 6:
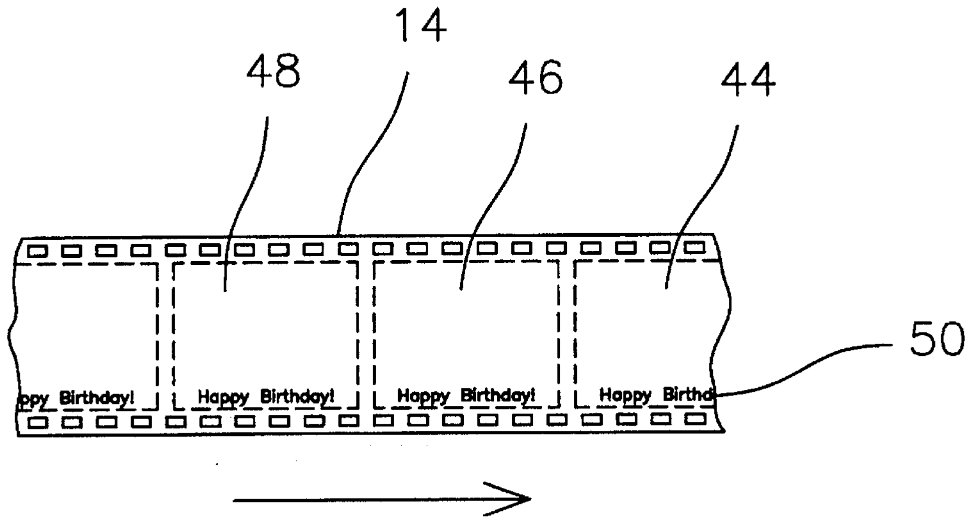
FIG. 6 is a view of the same film after it has been fully exposed and developed.

When using this mask system with the film with the pre-exposed image, the mask is first placed in the picture aperture with the mask flange 64 at the bottom. Then, the film canister 54 is put in place and the film 56 is pulled across and attached to the takeup reel. The camera back is closed, and picture taking proceeds. The pre-exposed latent image 58 lies behind the mask flange 64 on the side of the mask flange away from the lens so that the pre-exposed latent image is masked against double-exposure by picture taking. When the picture taking is complete, the film is rerolled into its canister. At a development site, the film is removed from its canister and developed. At that point, it resembles the film in FIG. 6. The film is mounted in slide mounts if positive, or pictures are printed therefrom if negative.

While the present invention has been disclosed with reference to a particular example of preferred embodiment, it is the applicant's intention to cover all modifications and equivalents within the scope of the following appended claims. It is therefore requested that the following claims be given a liberal interpretation which is within the spirit and scope of the applicant's contribution to this art.

What is claimed as being new and therefore desired to be protected by Letter Patent of the United States is as follows:

1. A film and masking system comprising:

(a) a film strip having a pre-exposed latent image strip within the film area usually reserved for picture exposure, said film strip having sprocket holes along the length thereof adjacent at least one edge thereof, said pre-exposed latent image being adjacent said sprocket holes away from said edge, said film being supplied in a film canister, said film extending from said film canister to wind on a separate takeup reel during sequential exposures on said film and rewinding into said canister when exposure is complete; and (b) a mask for removable insertion into a camera along with said film, said mask being a substantially opaque flexible strip which extends from said canister, said mask lying across the picture aperture of a camera lying in a direction of film motion in the camera, said mask being positioned to mask the pre-exposed latent image strip on said film so that when a picture is exposed on said film through the picture aperture of the camera, said latent image pre-exposed on said film is protected against double-exposure so that when developed, both the picture latent image and said pre-exposed latent image are developed to be visible.

2. The film and masking system of claim 1 wherein said masking strip has a hook thereon, said hook being positioned to engage a camera body adjacent the film windup spool within the camera body.

3. The film and masking system of claim 1 wherein said canister has a lip and said flexible mask is secured to said canister under said lip.

4. The film and masking system of claim 3 wherein said masking strip has a hook thereon, said hook being positioned to engage a camera body adjacent the film windup spool within the camera body.

5. A film and masking system comprising:

(a) a film strip having a pre-exposed latent image strip within the film area usually reserved for picture exposure, said film strip having sprocket holes along the length thereof adjacent at least one edge thereof, said pre-exposed latent image being adjacent said sprocket holes away from said edge, said film being supplied in a film canister, said film having a slot therein; and (b) a mask for removable insertion into a camera along with said film, said mask being a substantially opaque flexible strip, said mask being attached to said canister so that it is installed in a camera with said film, said mask strip having a hook thereon, said hook being positioned to engage a camera body adjacent the film windup spool within the camera body, said hook being engaged in said slot in said film so that said strip mask is held in position until said canister and said mask are installed in a camera, said mask lying across the picture aperture of a camera lying in a direction of film motion in the camera, said mask being positioned to mask the pre-exposed latent image strip on said film so that when a picture is exposed on said film through the picture aperture of the camera, said latent image pre-exposed on said film is protected against double-exposure so that when developed, both the picture latent image and said pre-exposed latent image are developed to be visible.

6. A film and masking system comprising:

(a) a film strip having a pre-exposed latent image strip within the film area usually reserved for picture exposure, said film strip being supplied in a canister, said film having a slot therein; and (b) a mask for removable insertion into a camera along with said film, said mask being a substantially opaque flexible strip, said mask being attached to said canister so that it is installed in a camera with said film, said flexible masking strip having a hook thereon, said hook being positioned to engage a camera body adjacent a film windup Spool within the camera body, said hook being engaged in said slot in said film so that said strip mask is held in position until said canister and said mask are installed in a camera, said mask lying across the picture aperture of a camera lying in a direction of film motion in the camera, said mask being positioned to mask the pre-exposed latent image strip on said film so that when a picture is exposed on said film through the picture aperture of the camera, said latent image pre-exposed on said film is protected against double-exposure so that when developed, both the picture latent image and said pre-exposed latent image are developed to be visible.

7. A film and masking system comprising:

(a) a film canister, said film canister having a lip;

(b) a film in said canister, said film extending from said canister through said lip, said film having a longitudinal direction corresponding to the direction from which said film is pulled from said canister, a pre-exposed latent image on said film extending longitudinally thereof, said film having sprocket holes therethrough, said film having first and second edges and said sprocket holes lying adjacent said edges and defining a picture area therebetween, said pre-exposed latent image lying in said picture area along the longitudinal direction of said film; and (c) a mask for positioning across the picture aperture in a camera, said mask being a flexible opaque strip mask attached to said film canister so that when said film is installed in the camera, said mask shields said pre-exposed latent image on said film from picture exposure through the lens of the camera.

8. The film and masking system of claim 7 wherein said mask is attached in the picture aperture of the camera in a longitudinal direction across the picture aperture and is positioned in the camera to mask said pre-exposed latent image on said film.

9. The film and masking system of claim 7 further including in combination therewith a camera having a picture aperture therein and said mask is detachably attached across said picture aperture.

10. The film and masking system of claim 7 wherein said mask is a flexible substantially opaque strip attached to said lip of said film canister.

11. The film and masking system of claim 10 wherein said mask has a hook thereon, said hook being for engaging in the film windup recess in the camera to hold said mask longitudinally across the picture aperture of the camera.

12. A film and masking system comprising:

(a) a film canister, said film canister having, a lip;

(b) a film in said canister, said film having a slit therein, said film extending from said canister through said lip, said film having a longitudinal direction corresponding to the direction from which said film is pulled from said canister, a pre-exposed latent image on said film extending longitudinally thereof, said film having sprocket holes therethrough, said film having first and second edges and said sprocket holes lying adjacent said edges and defining picture area therebetween, said pre-exposed latent image lying in said picture area along the longitudinal direction of said film; and (c) a mask for positioning across the picture aperture in a camera, said mask being a flexible substantially opaque strip attached to the lip of said film canister, said mask being initially engaged in said slit to hold said mask adjacent said pre-exposed latent image on said film, so that when said film is installed in the camera, said mask shields said pre-exposed latent image on said film from picture exposure through the lens of the camera.

13. The film and masking system of claim 12 wherein said mask has a hook thereon, said hook being for engaging in the film windup recess in the camera to hold said mask longitudinally across the picture aperture of the camera.

14. The film and masking system of claim 13 further including in combination therewith a camera having a picture aperture therein and said mask is detachably attached across said picture aperture.

* * * * *